United States Patent
Kakishita

(10) Patent No.: US 9,187,115 B2
(45) Date of Patent: Nov. 17, 2015

(54) STEERING APPARATUS

(71) Applicant: JTEKT CORPORATION, Osaka (JP)

(72) Inventor: Hideyuki Kakishita, Tokai (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/577,332

(22) Filed: Dec. 19, 2014

(65) Prior Publication Data

US 2015/0191194 A1 Jul. 9, 2015

(30) Foreign Application Priority Data

Jan. 8, 2014 (JP) ................. 2014-001873

(51) Int. Cl.
*B62D 1/189* (2006.01)
*B62D 1/184* (2006.01)
*B62D 1/187* (2006.01)

(52) U.S. Cl.
CPC ............. *B62D 1/184* (2013.01); *B62D 1/187* (2013.01); *B62D 1/189* (2013.01)

(58) Field of Classification Search
CPC ......... B62D 1/189; B62D 1/187; B62D 1/184
USPC ............................................. 74/493; 280/775
See application file for complete search history.

(56) References Cited

U.S. PATENT DOCUMENTS

| | | | | |
|---|---|---|---|---|
| 4,732,050 A * | 3/1988 | Vollmer | ............... | B62D 1/184 280/775 |
| 5,338,064 A * | 8/1994 | Sadakata et al. | ....... | B62D 1/184 280/775 |
| 5,531,317 A * | 7/1996 | Tomaru | ............... | B62D 1/184 280/775 |
| 5,743,150 A * | 4/1998 | Fevre et al. | ........... | B62D 1/184 280/775 |
| 5,787,759 A * | 8/1998 | Olgren | ................... | B62D 1/184 280/777 |
| 6,092,957 A * | 7/2000 | Fevre et al. | ........... | B62D 1/184 280/775 |
| 7,752,940 B2 * | 7/2010 | Lutz | ...................... | B62D 1/184 280/775 |
| 7,849,763 B2 * | 12/2010 | Lutz | ...................... | B62D 1/184 74/492 |
| 8,413,541 B2 * | 4/2013 | Davies et al. | .......... | B62D 1/184 280/777 |
| 2002/0171235 A1 | 11/2002 | Riefe et al. | | |
| 2003/0172766 A1 | 9/2003 | Masucci | | |
| 2004/0261565 A1 | 12/2004 | Uphaus et al. | | |
| 2008/0053264 A1 * | 3/2008 | Matsui et al. | .......... | B62D 1/184 74/493 |

FOREIGN PATENT DOCUMENTS

| | | |
|---|---|---|
| JP | 2005-534574 A | 11/2005 |
| JP | A-2006-117196 | 5/2006 |
| JP | A-2008-239085 | 10/2008 |

OTHER PUBLICATIONS

Jun. 24, 2015 Search Report issued in European Patent Application No. 15150335.6.
U.S. Appl. No. 14/599,111, filed Jan. 16, 2015 in the name of Sugiura et al.

* cited by examiner

Primary Examiner — Keith Frisby
(74) Attorney, Agent, or Firm — Oliff PLC

(57) ABSTRACT

A steering apparatus has a tilt mechanism, and a locking direction of a tilt lock operation lever is a direction in which the operation lever is pushed down about a central axis. A width of a second end of a tilt elongate hole, which is located on a tilt direction lower side, is narrower than a width of a first end of the tilt elongate hole, which is located on a tilt direction upper side.

3 Claims, 6 Drawing Sheets ated in a tilt direction. The fastening mem- 65
STEERING APPARATUS

INCORPORATION BY REFERENCE

The disclosure of Japanese Patent Application No. 2014-001873 filed on Jan. 8, 2014 including the specification, drawings and abstract is incorporated herein by reference in its entirety.

BACKGROUND OF THE INVENTION

1. Field of the Invention

The present invention relates to a steering apparatus.

2. Description of the Related Art

In steering apparatuses having a tilt mechanism, there has been proposed an art for performing a so-called tilt lock. In the art, stationary tooth rows are provided around a tilt elongate hole of a bracket, movable tooth rows are provided on a movable member that is held by a fastening shaft passed through the tilt elongate hole and that is guided along the tilt elongate hole, and both the tooth rows are meshed with each other to fix a steering column section for a steering wheel with the column section tilted. Refer to Japanese Patent Application Publication No. 2008-239085 (JP 2008-239085 A) and Japanese Patent Application Publication No. 2006-117196 (JP 2006-117196 A), for example.

When the tilt mechanism is locked with tooth top lands of the stationary tooth rows abutting on tooth top lands of the movable tooth rows, the locking state becomes unstable because the stationary tooth rows and the movable tooth rows are not meshed with each other. This locking state is referred to as a half-locking. In JP 2008-239085 A, in order to suppress the occurrence of the half-locking, a flexible member having ridge portions that protrude beyond a tooth depth of teeth of the movable tooth rows is provided on the movable member.

In JP 2006-117196 A, in order to suppress the occurrence of the half-locking, the tooth shape of the tooth rows is formed into an arc shape.

However, in the above arts, the structure becomes complicated due to an increase in the number of parts or the complicated tooth shape.

SUMMARY OF THE INVENTION

An object of the present invention is to provide a steering apparatus capable of suppressing the occurrence of a half-locking in a simple configuration.

A steering apparatus according to an aspect of the present invention includes: a steering shaft connected to a steering member; a hollow steering column rotatably supporting the steering shaft and being pivotable about a tilt center; a first bracket including a first side plate and fixed to a vehicle body; a second bracket that includes a second side plate facing the first side plate and is fixed to the steering column; and a lock mechanism that includes a fastening shaft passed through a tilt elongate hole as a first through hole of the first side plate and a second through hole of the second side plate, an operation lever capable of rotating together with the fastening shaft, and a fastening mechanism that includes a fastening member and fastens the first side plate to the second side plate by the fastening member upon a rotation operation of the operation lever in a locking direction. The fastening mechanism further includes a first tooth row that is provided in close vicinity of the tilt elongate hole of the first side plate and is formed of parallel teeth arranged in a tilt direction. The fastening member includes a fastening plate for fastening the first side plate, a second tooth row that is provided on the fastening plate and is formed of parallel teeth meshed with the first tooth row, and a boss that extends from the fastening plate, is passed through the tilt elongate hole with a predetermined play therebetween to be restrained from rotating, and is guided along the tilt elongate hole at the time of tilt adjustment. The locking direction is a direction in which the operation lever is pushed down or up about a central axis of the fastening shaft. The tilt elongate hole includes a first end located on a tilt direction upper side and a second end located on a tilt direction lower side. In the case where the locking direction is the direction in which the operation lever is pushed down, the width of the second end is narrower than the width of the first end. In the case where the locking direction is the direction in which the operation lever is pushed up, the width of the first end is narrower than the width of the second end.

In the steering apparatus according to the above aspect, at the time of tilt adjustment, in the case where the locking direction is the direction in which the operation lever is pushed down and when the boss of the fastening member is in a first state where the boss is moved to the vicinity of the second end of the tilt elongate hole, which is located on the tilt direction lower side, a play for the boss about the central axis of the fastening shaft is small, and the second tooth row is meshed with the first tooth row.

When the boss of the fastening member is in a second state where the boss is moved to the vicinity of the first end of the tilt elongate hole, which is located on the tilt direction upper side, the play of the boss about the central axis of the fastening shaft is large, and therefore, at the time of a tilt lock, the orientation of the second tooth row is corrected downward in the rotation direction about the central axis of the fastening shaft by a push-down locking operation in the locking direction of the operation lever such that the second tooth row can be meshed with the first tooth row. Accordingly, it is possible to suppress the occurrence of a half-locking in a simple configuration in which the parallel teeth are used as the tooth rows and the widths of opposite ends of the tilt elongate hole are set to be different from each other.

At the time of tilt adjustment, in the case where the locking direction is the direction in which the operation lever is pushed up and when the boss of the fastening member is in a first state where the boss is moved to the vicinity of the first end of the tilt elongate hole, which is located on the tilt direction upper side, a play for the boss about the central axis of the fastening shaft is small, and the second tooth row is meshed with the first tooth row.

When the boss of the fastening member is in a second state where the boss is moved to the vicinity of the second end of the tilt elongate hole, which is located on the tilt direction lower side, the play for the boss about the central axis of the fastening shaft is large, and therefore, at the time of a tilt lock, the orientation of the second tooth row is corrected upward in the rotation direction about the central axis of the fastening shaft by a push-up locking operation in the locking direction of the operation lever such that the second tooth row can be meshed with the first tooth row.

It is possible to suppress the occurrence of a half-locking in a simple configuration in which the parallel teeth are used as the tooth rows and the widths of the opposite ends of the tilt elongate hole are set to be different from each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereafter, embodiments of the present invention will be described with reference to the accompanying drawings.

Figure 1:
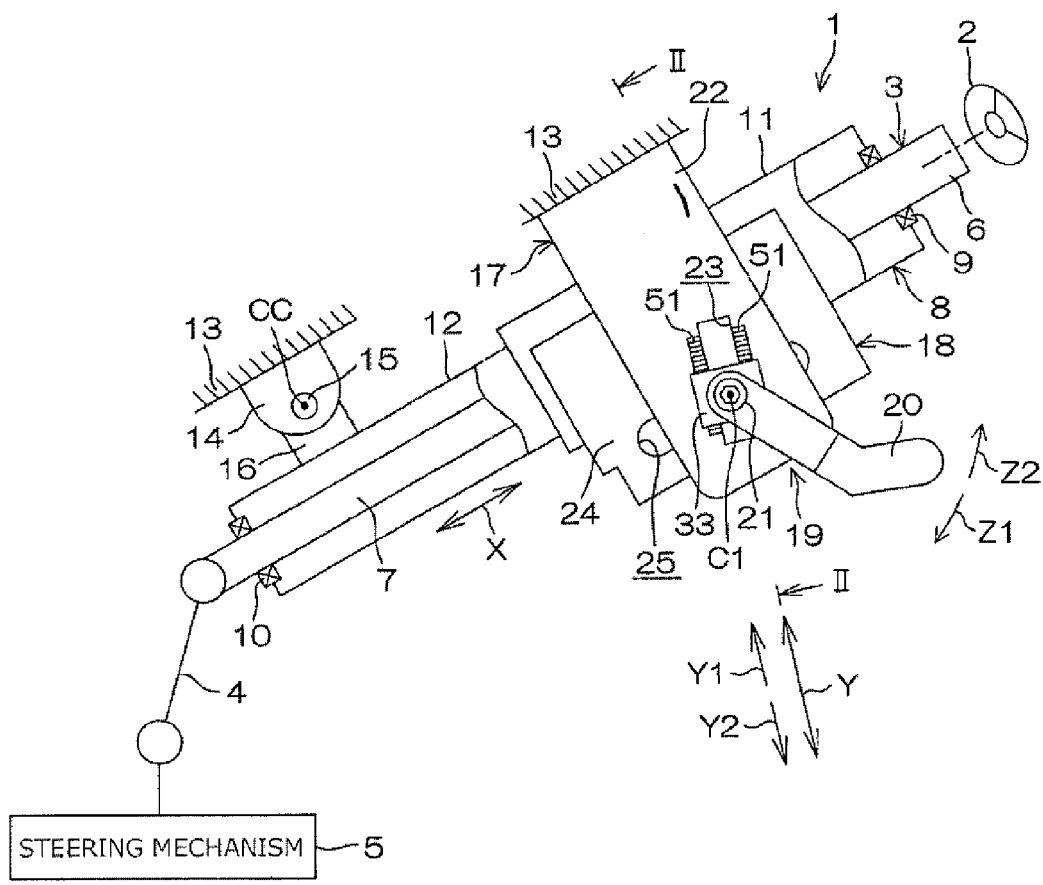
FIG. 1 is a schematic sectional view of a steering apparatus according to a first embodiment of the present invention.

Referring to FIG. 1, a steering apparatus 1 includes a steering member 2 such as a steering wheel, a steering shaft 3 having the steering member 2 coupled to its one end in an axial direction X, and a steering mechanism 5 coupled to the steering shaft 3 through an intermediate shaft 4 and the like.

The steering mechanism 5 is a rack-and-pinion mechanism for steering steered wheels (not shown) synchronously with a steering operation of the steering member 2. A rotation of the steering member 2 is transmitted to the steering mechanism 5 through the steering shaft 3, the intermediate shaft 4 and the like. The rotation transmitted to the steering mechanism 5 is translated into an axial movement of a rack shaft (not shown). Thus, the steered wheels are turned.

The steering shaft 3 has a tubular upper shaft 6 and a lower shaft 7, which are fitted so as to be slidable relative to each other by spline fitting or serration fitting, for example. The steering member 2 is coupled to one end of the upper shaft 6. The steering shaft 3 can be extended and contracted in the axial direction X through a relative sliding movement between the upper shaft 6 and the lower shaft 7.

The steering apparatus 1 includes a hollow steering column 8 rotatably supporting the steering shaft 3. The steering shaft 3 is passed through the steering column 8 and is rotatably supported by the steering column 8 through a plurality of bearings 9, 10.

The steering column 8 has an upper jacket 11 as an outer jacket and a lower jacket 12 as an inner jacket, which are fitted so as to be slidable relative to each other. The steering column 8 can be extended and contracted in the axial direction X through a relative sliding movement between the upper jacket 11 and the lower jacket 12. The upper jacket 11 rotatably supports the upper shaft 6 through the bearing 9. In addition, the upper jacket 11 is coupled to the upper shaft 6 through the bearing 9 so as to be movable together with the steering shaft 3 in the axial direction X.

The steering apparatus 1 includes a stationary bracket 14 fixed to a vehicle body 13, a tilt center shaft 15 supported by the stationary bracket 14, and a column bracket 16 that is fixed to an outer periphery of the lower jacket 12 and is rotatably supported by the tilt center shaft 15. The steering column 8 and the steering shaft 3 are pivotable (tiltable) in a tilt direction Y about a tilt center CC that is a central axis of the tilt center shaft 15.

A position of the steering member 2 can be adjusted by pivoting (tilting) the steering shaft 3 and the steering column 8 about the tilt center CC. This adjustment is referred to as tilt adjustment. The position of the steering member 2 can be adjusted by extending and contracting the steering shaft 3 and the steering column 8 in the axial direction X. This adjustment is referred to as a telescopic adjustment.

The steering apparatus 1 further includes a first bracket 17 fixed to the vehicle body 13, a second bracket 18 fixed to the upper jacket 11 of the steering column 8, and a lock mechanism 19. The first bracket 17 is locked onto the second bracket 18 by the lock mechanism 19 such that a position of the steering column 8 relative to the vehicle body 13 is fixed, and a position of the steering member 2 relative to the vehicle body 13 is thus fixed.

The lock mechanism 19 includes an operation lever 20 rotatably operated by a driver and a fastening shaft 21 that is capable of rotating together with the operation lever 20 and is passed through the first bracket 17 and the second bracket 18. A central axis C1 of the fastening shaft 21 corresponds to a rotation center of the operation lever 20.

The fastening shaft 21 is passed through tilt elongate holes 23 as first through holes that are respectively provided in a pair of first side plates 22 (only one of the first side plates 22 is shown in FIG. 1) of the first bracket 17 and extend in the tilt direction Y. The fastening shaft 21 is also passed through telescopic elongate holes 25 as second through holes that are respectively provided in a pair of second side plates 24 (only one of the second side plates 24 is shown in FIG. 1) of the second bracket 18 and extend in a telescopic direction (corresponding to the axial direction X).

A locking direction Z1 in the lock mechanism 19 is a direction in which the operation lever 20 is pushed down about the central axis C1 of the fastening shaft 21. An unlocking direction Z2 is a direction opposite to the locking direction Z1.

Figure 2:
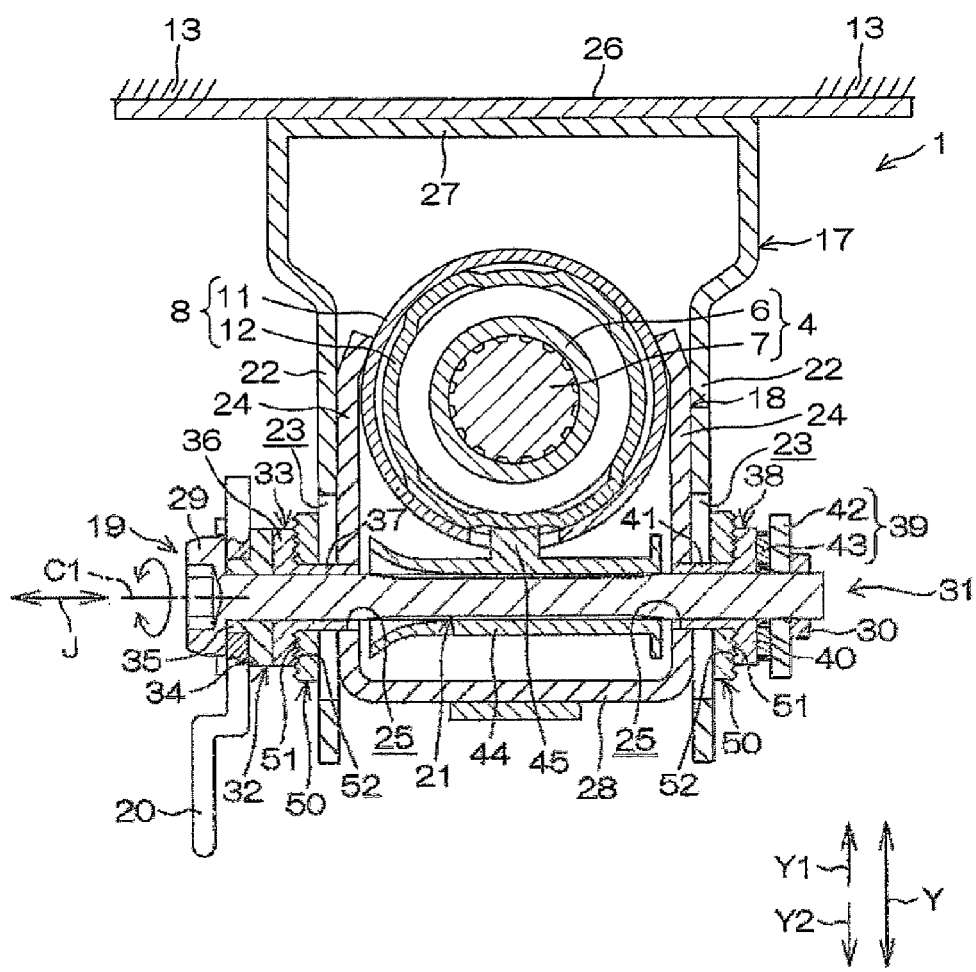
FIG. 2 is a schematic sectional view showing a main part of the steering apparatus according to the first embodiment and corresponding to a section taken along the line II-II in FIG. 1.

As shown in FIG. 2, the first bracket 17 includes an attaching plate 26 detachably supported by the vehicle body 13 through a capsule mechanism (not shown), a top plate 27 fixed along the attaching plate 26, and the first side plates 22 extending from both ends of the top plate 27 downward in the tilt direction Y.

The second bracket 18 is formed into a U-shape and has the second side plates 24 facing the first side plates 22 of the first bracket 17 and a connecting plate 28 connecting lower ends of the second side plates 24 in the tilt direction Y.

The fastening shaft 21 is formed of a bolt that is passed through the tilt elongate holes 23 of the first side plates 22 of the first bracket 17 and the telescopic elongate holes 25 of the second side plates 24 of the second bracket 18. A head portion 29 located on one end of the fastening shaft 21 is fixed to the operation lever 20 so as to be rotatable together with the operation lever 20. A nut 30 is threadedly engaged with the other end of the fastening shaft 21.

The lock mechanism 19 includes the operation lever 20, the fastening shaft 21, and a fastening mechanism 31 that performs a tilt lock and a telescopic lock upon a rotation operation of the operation lever 20. The fastening mechanism 31 includes a rotatable cam 32 rotating together with the operation lever 20, a first fastening member 33 that forms a non-rotatable cam cam-engaged with the rotatable cam 32 for fastening one of the first side plates 22, a second fastening member 38 for fastening the other first side plate 22, the nut 30, and an interposing member 39 interposed between the second fastening member 38 and the nut 30.

The operation lever 20, the rotatable cam 32 and the first fastening member 33 as a non-rotatable cam are interposed between the head portion 29 of the fastening shaft 21 and the one first side plate 22. The second fastening member 38 and the interposing member 39 are interposed between the nut 30 and the other first side plate 22 of the first bracket 17. The rotatable cam 32, the first fastening member 33, the second fastening member 38, and the interposing member 39 are supported by an outer periphery of the fastening shaft 21. The fastening members 33, 38 are supported movably in an axial direction J of the fastening shaft 21.

The rotatable cam 32 is coupled to the operation lever 20 so as to be rotatable together with the operation lever 20 and is restrained from moving relative to the fastening shaft 21 in the axial direction J. The operation lever 20 is restrained from rotating relative to the head portion 29 of the fastening shaft 21. The rotatable cam 32 includes an annular plate 34 and a boss 35 that is provided around a center hole of the annular plate 34 and is passed through a through hole of the operation lever 20 so as to be rotatable together with the operation lever 20.

The lock mechanism 19 includes first tooth rows 51 provided on outer side faces of the first side plates 22 in close vicinity of the tilt elongate holes 23 and second tooth rows 52 provided on the fastening members 33, 38 and meshed with the corresponding first tooth rows 51.

The first tooth rows 51 may be formed on first tooth row forming members 50 having a block shape fixed on the outer side faces of the first side plates 22, as shown in FIG. 2, or may be formed directly on the first side plates 22, though not shown.

As shown in FIG. 1, the first tooth rows 51 is arranged on respective sides of the tilt elongate hole 23. Each of the first tooth rows 51 is a row of parallel teeth arranged in the tilt direction Y. The first tooth rows 51 face each other in a direction orthogonal to the longitudinal direction (the tilt direction Y) of the tilt elongate hole 23. The tilt elongate hole 23 is an arc hole with its center placed at the tilt center CC. However, because the distance from the tilt center CC to the tilt elongate hole 23 (corresponding to the radius of the arc hole) is remarkably long compared to the length in the longitudinal direction of the tilt elongate hole 23, the tilt elongate hole 23 substantially resembles a straight hole.

Figure 3:
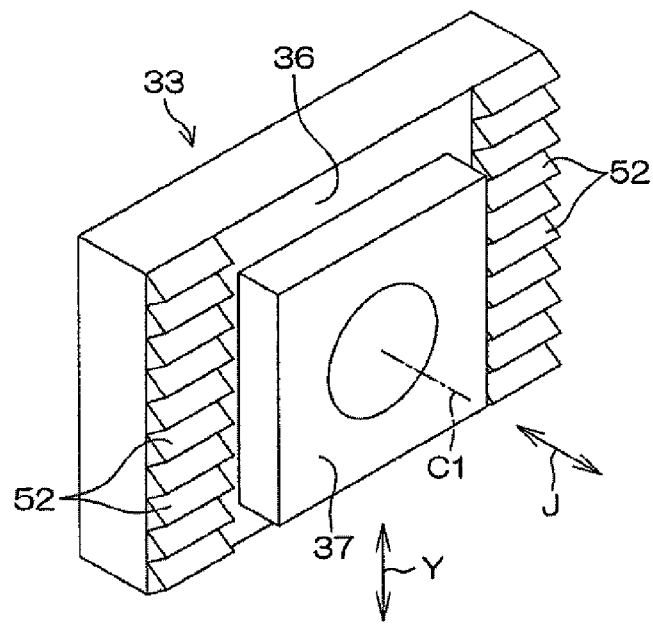
FIG. 3 is a perspective view showing a first fastening member that forms a non-rotatable cam of a fastening mechanism according to the first embodiment.

As shown in FIG. 3, the first fastening member 33 as a non-rotatable cam includes a fastening plate 36 having one surface that faces the annular plate 34 of the rotatable cam 32 and the other surface on which a pair of the second tooth rows 52 respectively meshed with the pair of the first tooth rows 51 on the one first side plate 22 is formed, and a boss 37 extending from the fastening plate 36. Each of the second tooth rows 52 is a row of parallel teeth arranged in the tilt direction Y. The second tooth rows 52 are arranged on respective sides with the boss 37 interposed therebetween and face each other in a direction orthogonal to the tilt direction Y.

As shown in FIG. 2, the boss 37 of the first fastening member 33 is inserted into the tilt elongate hole 23 of the one first side plate 22 of the first bracket 17. Because the boss 37 is inserted into the tilt elongate hole 23 with a predetermined play therebetween, the rotation of the first fastening member 33 is restricted to a predetermined angular range about the central axis C1 of the fastening shaft 21. The boss 37 is guided along the tilt elongate hole 23 at the time of tilt adjustment.

Figure 5A:
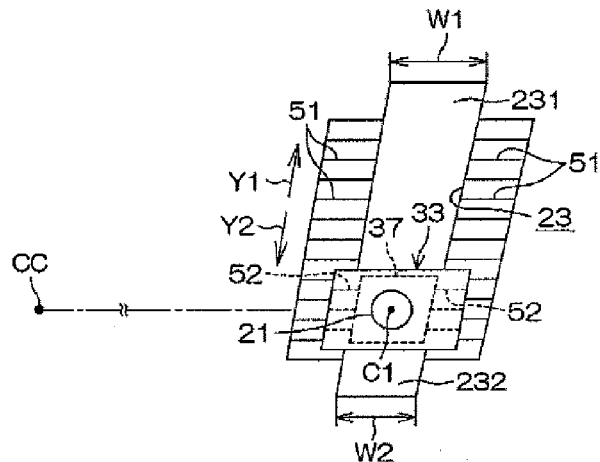
FIG. 5A is a schematic view illustrating a positional relation between first tooth rows on respective sides of a tilt elongate hole and a fastening member having second tooth rows according to the first embodiment, and illustrating a state where, at the time of tilt adjustment, a fastening shaft is moved to the vicinity of a second end of the tilt elongate hole, which has a narrow width of the hole.

As shown in FIG. 5A, the tilt elongate holes 23 has a first end 231 located on a tilt direction upper side Y1 and a second end 232 located on a tilt direction lower side Y2. Although being an arc hole, the tilt elongate hole 23 is depicted as straight lines for the sake of simplification. As in the case of the present embodiment, when the locking direction Z1 of the lock mechanism 19 is the direction in which the operation lever 20 is pushed down about the central axis C1 of the fastening shaft 21, as shown in FIG. 1, a width W2 of the second end 232 of the tilt elongate hole 23 is set to be narrower than a width W1 of the first end 231 of the tilt elongate hole 23 (W1>W2), as shown in FIG. 5A. For example, with the center of the tilt elongate hole 23 in the width direction being on an ideal center orbit (an arc orbit) around the tilt center CC, the width of the tilt elongate hole 23 continuously varies between the first end 231 and the second end 232.

Figure 4:
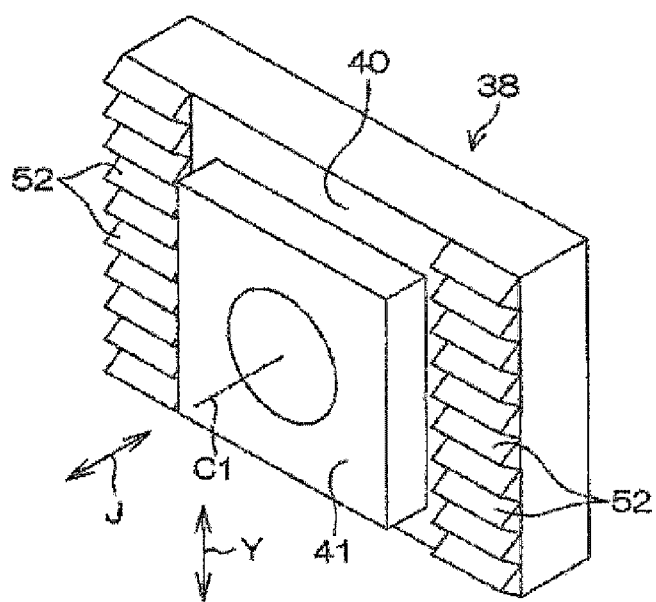
FIG. 4 is a perspective view showing a second fastening member according to the first embodiment.

As shown in FIG. 4, the fastening member 38 includes a fastening plate 40, on which the second tooth rows 52 meshed with the first tooth rows 51 on the other first side plate 22 of the first bracket 17 are formed, and a boss 41 extending from the fastening plate 40. Each of the second tooth rows 52 is a row of parallel teeth arranged in the tilt direction Y. The second tooth rows 52 are arranged on respective sides with the boss 41 interposed therebetween and face each other in a direction orthogonal to the tilt direction Y.

As shown in FIG. 2, the boss 41 of the second fastening member 38 is inserted into the tilt elongate hole 23 of the other first side plate 22 of the first bracket 17.

Because the boss 41 is inserted into the tilt elongate hole 23 with a predetermined play therebetween, the rotation of the second fastening member 38 is restricted to a predetermined angular range about the central axis C1 of the fastening shaft 21. The boss 41 is guided along the tilt elongate hole 23 at the time of tilt adjustment.

The interposing member 39 includes a washer 42 interposed between the nut 30 and the fastening member 38 and a needle roller bearing 43 interposed between the washer 42 and the fastening plate 40 of the fastening member 38. A sleeve 44 that rotates together with the fastening shaft 21 is fitted to an outer periphery of a shaft portion of the fastening shaft 21 by a serration fitting. A push-up cam 45 is formed on an outer periphery of the sleeve 44 so as to be rotatable together with the sleeve 44.

When the rotatable cam 32 rotates relative to the first fastening member 33 upon the rotation of the operation lever 20, the first fastening member 33 is moved in the axial direction J of the fastening shaft 21 such that the first side plates 22 of the first bracket 17 are sandwiched and fastened between the fastening plate 36 of the first fastening member 33 and the fastening plate 40 of the second fastening member 38.

As a result, the first side plates 22 of the first bracket 17 are pressed into contact with the corresponding second side plates 24 of the second bracket 18, whereby a tilt lock and a telescopic lock are performed. At the same time as fastening by the fastening members 33, 38, the second tooth rows 52 of the fastening members 33, 38 are brought into meshing with the corresponding first tooth rows 51 such that a strong tilt lock is achieved. In addition, the push-up cam 45 pushes up the lower jacket 12, whereby locking is carried out between the jackets 11, 12.

According to the present embodiment, at the time of tilt adjustment, when the boss 37 of the fastening member 33 is in a first state where the boss 37 is moved to the vicinity of the second end 232 of the tilt elongate hole 23, which is located on the tilt direction lower side Y2, as shown in FIG. 5A, the play for the boss 37 about the central axis C1 of the fastening shaft 21 is small, and the second tooth rows 52 are meshed with the first tooth rows 51. That is, frank lines of the tooth rows 51, 52 become almost parallel to each other.

Figure 5B:
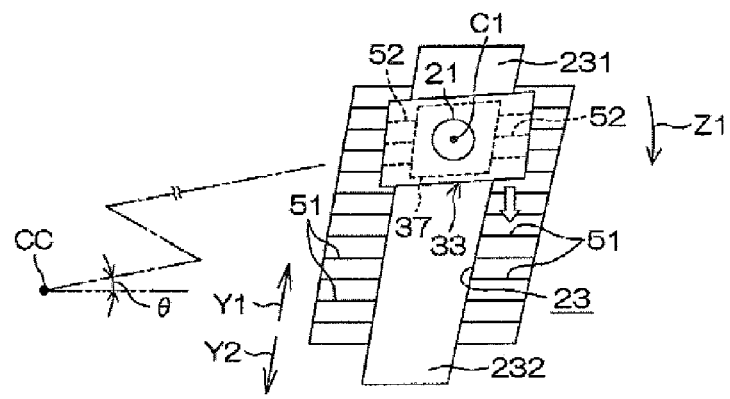
FIG. 5B is a schematic view illustrating a positional relation between the first tooth rows on respective sides of the tilt elongate hole and the fastening member having the second tooth rows according to the first embodiment, and illustrating a state where, at the time of tilt adjustment, the fastening shaft is moved to the vicinity of a first end of the tilt elongate hole, which has a wide width of the hole.

At the time of tilt adjustment, when the boss 37 of the fastening member 33 is in a second state where the boss 37 is moved to the vicinity of the first end 231 of the tilt elongate hole 23, which is located on the tilt direction upper side Y1, as shown in FIG. 5B, the orientation of the second tooth rows 52 is changed by a rotation angle θ, for example, upward in the rotation direction about the tilt center CC relative to the orientation of the second tooth rows 52 in the first state.

Figure 5C:
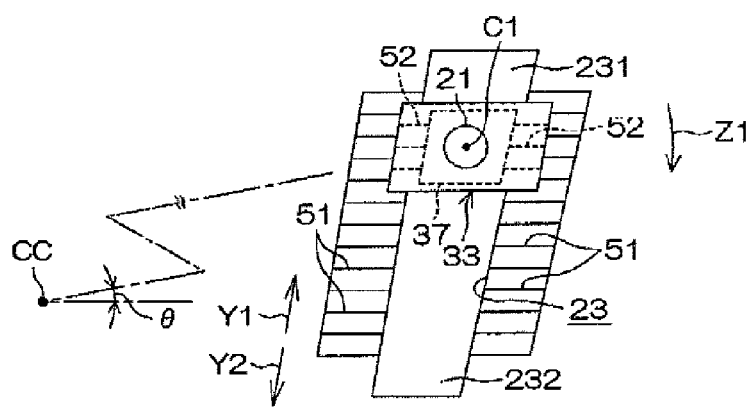
FIG. 5C is a schematic view illustrating a positional relation between the first tooth rows on respective sides of the tilt elongate hole and the fastening member having the second tooth rows according to the first embodiment, and illustrating a state where a tilt lock is performed with the fastening shaft moved to the vicinity of the first end.

In the second state, the play for the boss 37 about the central axis C1 of the fastening shaft 21 is large, and thus, at the time of a tilt lock, the orientation of the second tooth rows 52 is corrected downward in the rotation direction about the central axis C1 of the fastening shaft 21 by a push-down locking operation in the locking direction Z1 of the operation lever 20, as shown in FIG. 5C, whereby the second tooth rows 52 can be meshed with the first tooth rows 51.

Accordingly, it is possible to suppress the occurrence of a half-locking in a simple configuration in which parallel teeth are used as the tooth rows 51, 52 and the widths W1, W2 of the opposite ends 231, 232 of the tilt elongate hole 23 are set to be different from each other.

Figure 6:
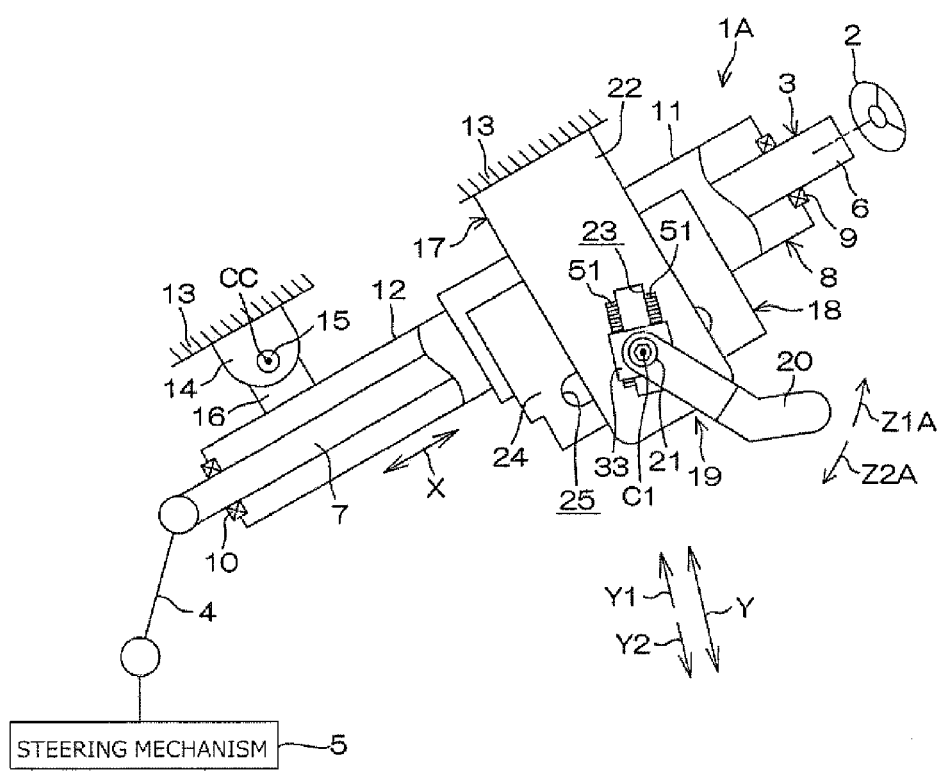
FIG. 6 is a schematic sectional view of a steering apparatus according to a second embodiment of the present invention.

FIG. 6 is a schematic sectional view of a steering apparatus 1A according to a second embodiment of the present invention. The second embodiment in FIG. 7 differs from the first embodiment in FIG. 1 mainly in the following respects. That is, the locking direction Z1A in the lock mechanism 19 is a direction in which the operation lever 20 is pushed up about the central axis C1 of the fastening shaft 21. In addition, the unlocking direction Z2A in the lock mechanism 19 is a direction in which the operation lever 20 is pushed down about the central axis C1 of the fastening shaft 21.

Figure 7A:
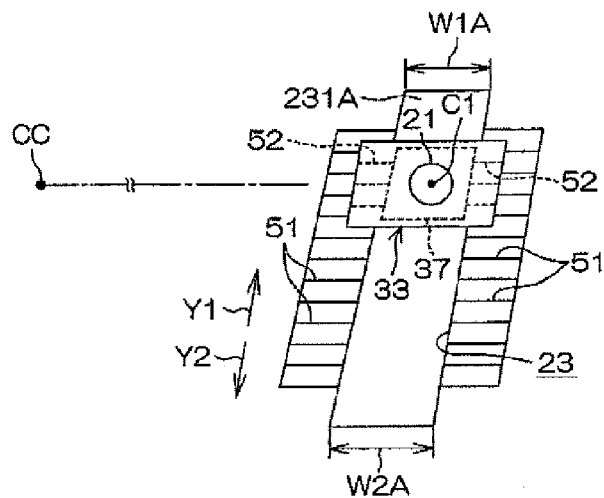
FIG. 7A is a schematic view illustrating a positional relation between first tooth rows on respective sides of a tilt elongate hole and a fastening member having second tooth rows according to a second embodiment, and illustrating a state where, at the time of tilt adjustment, a fastening shaft is moved to the vicinity of a first end of the tilt elongate hole, which has a narrow width of the hole.

In addition, as shown in FIG. 7A, the tilt elongate hole 23 includes a first end 231A located on the tilt direction upper side Y1 and a second end 232A located on the tilt direction lower side Y2. The width W1A of the first end 231A of the tilt elongate hole 23 is narrower than the width W2A of the second end 232A of the tilt elongate hole 23 (W1A<W2A).

Of components in the second embodiment shown in FIG. 6 and FIG. 7, the same components as those in the first embodiment shown in FIG. 1 and FIG. 5 are denoted with the same reference numerals as those of the components in the first embodiment shown in FIG. 1 and FIG. 5.

According to the present embodiment, at the time of tilt adjustment, when the boss 37 of the fastening member 33 is in a first state where the boss 37 is moved to the vicinity of the first end 231A of the tilt elongate hole 23, which is located on the tilt direction upper side Y1, as shown in FIG. 7A, the play for the boss 37 about the central axis C1 of the fastening shaft 21 is small, and the second tooth rows 52 are meshed with the first tooth rows 51. That is, frank lines of both the tooth rows 51, 52 become almost parallel to each other.

Figure 7B:
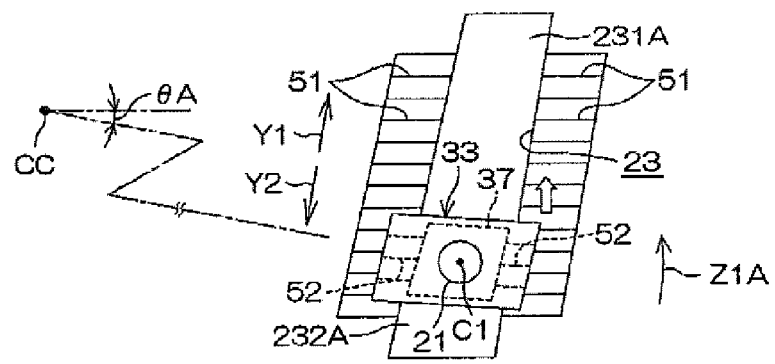
FIG. 7B is a schematic view illustrating a positional relation between the first tooth rows on respective sides of the tilt elongate hole and the fastening member having the second tooth rows according to the second embodiment, and illustrating a state where, at the time of tilt adjustment, the fastening shaft is moved to the vicinity of a second end of the tilt elongate hole, which has a wide width of the hole.

At the time of tilt adjustment, when the boss 37 of the fastening member 33 is in a second state where the boss 37 is moved to the vicinity of the second end 232A of the tilt elongate hole 23, which is located on the tilt direction lower side Y2, as shown in FIG. 7B, the orientation of the second tooth rows 52 is changed by a rotation angle θA, for example, downward in the rotation direction about the tilt center CC relative to the orientation of the second tooth rows 52 in the first state.

Figure 7C:
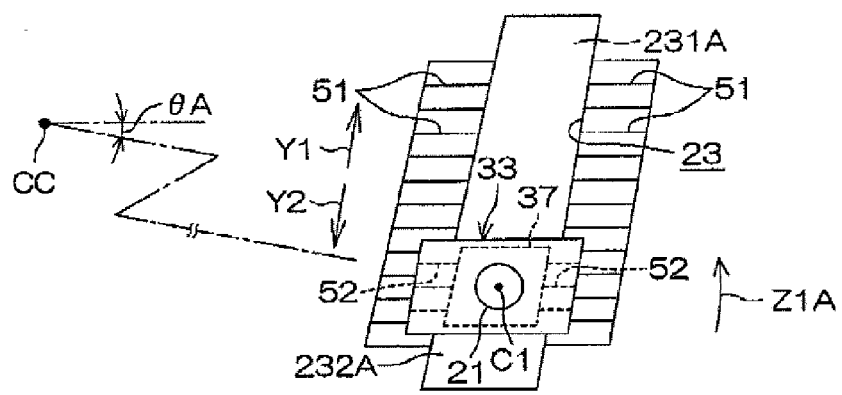
FIG. 7C is a schematic depiction illustrating the positional relation between the first tooth rows on respective sides of the tilt elongate hole and the fastening member having the second tooth rows according to the second embodiment, the illustrating a state where a tilt lock is performed with the fastening shaft moved to the vicinity of the second end.

In the second state, the play for the boss 37 about the central axis C1 of the fastening shaft 21 is large, and thus, at the time of a tilt lock, the orientation of the second tooth rows 52 is corrected upward in the rotation direction about the central axis C1 of the fastening shaft 21 by the push-up locking operation in the locking direction Z1A of the operation lever 20, as shown in FIG. 7C, whereby the second tooth rows 52 can be meshed with the first tooth rows 51.

Accordingly, it is possible to suppress the occurrence of a half-locking in a simple configuration in which parallel teeth are used as the tooth rows 51, 52 and the widths W1A, W2A of the opposite ends 231A, 232A of the tilt elongate hole 23 are set to be different from each other.

The present invention is not limited to the above embodiments. For example, although, in the above embodiments, the second tooth rows 52 are made of a single material and are formed together with each of the fastening members 33, 38, the present invention is not limited to such configuration, and a second tooth row forming member on which the second tooth rows are formed may be held on each of the fastening members.

In addition, the first tooth rows 51 may be provided only on the one first side plate 22, and the second tooth rows 52 may be provided only on the fastening plate 36 facing the one first side plate 22 such that locking through the meshing with the first tooth rows 51 and the second tooth rows 52 may be carried out only between the one first side plate 22 and the fastening plate 36.

What is claimed is:

1. A steering apparatus comprising:
a steering shaft connected to a steering member;
a hollow steering column rotatably supporting the steering shaft and being pivotable about a tilt center;
a first bracket including a first side plate and fixed to a vehicle body;
a second bracket that includes a second side plate facing the first side plate and is fixed to the steering column; and
a lock mechanism that includes a fastening shaft passed through a tilt elongate hole as a first through hole of the first side plate and a second through hole of the second side plate, an operation lever capable of rotating together with the fastening shaft, and a fastening mechanism that includes a fastening member and fastens the first side plate to the second side plate by the fastening member upon a rotation operation of the operation lever in a locking direction; wherein:

the fastening mechanism further includes a first tooth row that is provided in close vicinity of the tilt elongate hole of the first side plate and is formed of parallel teeth arranged in a tilt direction, the fastening member includes a fastening plate for fastening the first side plate, a second tooth row that is provided on the fastening plate and is formed of parallel teeth meshed with the first tooth row, and a boss that extends from the fastening plate, is passed through the tilt elongate hole with a predetermined play therebetween to be restrained from rotating, and is guided along the tilt elongate hole at the time of tilt adjustment, the tilt elongate hole includes a first end located on a tilt direction upper side and a second end located on a tilt direction lower side, and a width of the first end of the tilt elongate hole is different from a width of the second end of the tilt elongate hole.

2. The steering apparatus according to claim 1, wherein:

the locking direction is a direction in which the operation lever is pushed down about a central axis of the fastening shaft, and the width of the second end is narrower than the width of the first end.

3. The steering apparatus according to claim 1, wherein:

the locking direction is a direction in which the operation lever is pushed up about a central axis of the fastening shaft, and the width of the first end is narrower than the width of the second end.

* * * * *